(12) United States Patent
Slaby et al.

(10) Patent No.: US 10,904,245 B1
(45) Date of Patent: Jan. 26, 2021

(54) ADAPTIVE METHOD FOR BIOMETRICALLY CERTIFIED COMMUNICATION

(71) Applicant: GOOGLE TECHNOLOGY HOLDINGS LLC, Mountain View, CA (US)

(72) Inventors: Jiri Slaby, Buffalo Grove, IL (US); Roger W. Ady, Chicago, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 727 days.

(21) Appl. No.: 15/464,283

(22) Filed: Mar. 20, 2017

Related U.S. Application Data

(63) Continuation of application No. 14/108,602, filed on Dec. 17, 2013, now Pat. No. 9,602,483.

(60) Provisional application No. 61/863,741, filed on Aug. 8, 2013.

(51) Int. Cl.
*H04L 29/06* (2006.01)

(52) U.S. Cl.
CPC .......... *H04L 63/0861* (2013.01); *H04L 63/10* (2013.01)

(58) Field of Classification Search
CPC ..... H04L 63/08; H04L 63/0861; H04L 63/04; H04L 63/0428; H04L 63/10
USPC ...................................................... 726/7, 10
See application file for complete search history.

(56) References Cited

U.S. PATENT DOCUMENTS

| | | | |
|---|---|---|---|
| 5,930,804 | A * | 7/1999 | Yu ............................ G06F 21/32 |
| 7,945,861 | B1 * | 5/2011 | Karam .................. G06F 16/957 715/751 |
| 8,099,598 | B1 | 1/2012 | Liu |
| 8,359,642 | B1 | 1/2013 | Wurtenberger et al. |
| 8,392,357 | B1 | 3/2013 | Zou et al. |
| 9,065,842 | B2 | 6/2015 | Vandervort |
| 2002/0059364 | A1 | 5/2002 | Coulthard et al. |
| 2002/0104026 | A1 | 8/2002 | Barra et al. |
| 2002/0116508 | A1 | 8/2002 | Khan et al. |
| 2003/0037261 | A1 | 2/2003 | Meffert et al. |

(Continued)

FOREIGN PATENT DOCUMENTS

WO WO-2002/023796 3/2002
WO WO-2005/112337 A1 11/2005

*Primary Examiner* — Matthew T Henning
(74) *Attorney, Agent, or Firm* — Lerner, David, Littenberg, Krumholz & Mentlik, LLP

(57) ABSTRACT

A recipient communication device and method wherein a user authenticates a message that is being received. The method includes receiving, by a messaging utility of the recipient communication device, a message transmitted from a sender communication device. The messaging utility determines that one of (a) sender authentication of the message and (b) recipient authentication to open the message is required. In response to sender authentication being required, the recipient communication device transmits a request to the sender communication device for sender authentication of the message, and receives a certification of the message based on an authentication of a user input via the sender communication device. When recipient authentication is required, the recipient is prompted to enter biometric input at the recipient device. In one embodiment, a clearinghouse service authenticates a user of a communication device in order for the recipient communication device to receive certification of the user and/or the message.

20 Claims, 7 Drawing Sheets

(56) References Cited

U.S. PATENT DOCUMENTS

| | | |
|---|---|---|
| 2003/0050898 A1 | 3/2003 | Oppat et al. |
| 2003/0140235 A1 | 7/2003 | Immega et al. |
| 2003/0158960 A1 | 8/2003 | Engberg |
| 2004/0181581 A1 | 9/2004 | Kosco |
| 2005/0169274 A1 | 8/2005 | Shuster |
| 2005/0207614 A1 | 9/2005 | Schonberg et al. |
| 2005/0289079 A1 | 12/2005 | Krishan et al. |
| 2006/0015736 A1 | 1/2006 | Callas et al. |
| 2006/0123476 A1 | 6/2006 | Yaghmour |
| 2006/0206725 A1 * | 9/2006 | Milgramm .............. G06F 21/32 713/186 |
| 2007/0094390 A1 | 4/2007 | Nussey |
| 2008/0141033 A1 | 6/2008 | Ginter et al. |
| 2009/0187759 A1 | 7/2009 | Marsico |
| 2009/0198997 A1 | 8/2009 | Yeap et al. |
| 2009/0234764 A1 | 9/2009 | Friesen |
| 2009/0327714 A1 | 12/2009 | Yaghmour |
| 2010/0211997 A1 | 8/2010 | McGeehan et al. |
| 2011/0191832 A1 | 8/2011 | Davis et al. |
| 2012/0110098 A1 | 5/2012 | Matsugashita |
| 2012/0124664 A1 | 5/2012 | Stein et al. |
| 2013/0074195 A1 | 3/2013 | Johnston et al. |
| 2013/0227664 A1 * | 8/2013 | McKay ................ H04L 9/3231 726/7 |
| 2015/0046711 A1 | 2/2015 | Slaby et al. |
| 2015/0046996 A1 | 2/2015 | Slaby et al. |

* cited by examiner

ADAPTIVE METHOD FOR BIOMETRICALLY CERTIFIED COMMUNICATION

CROSS-REFERENCE TO RELATED APPLICATIONS

The present application claims the benefit of priority under 35 U.S.C. § 120 as a continuation of U.S. patent application Ser. No. 14/108,602 entitled "Adaptive Method for Biometrically Certified Communication," filed on Dec. 17, 2013, which claims priority benefit under 35 U.S.C. 119(e) from provisional application, Ser. No. 61/863,741, entitled "ADAPTIVE METHOD FOR BIOMETRICALLY CERTIFIED COMMUNICATION," filed on Aug. 8, 2013, each of the above applications being hereby expressly incorporated herein by reference in their entirety.

BACKGROUND

1. Technical Field

The present disclosure generally relates to electronic communication devices and in particular to transmission and reception of electronic messages by electronic communication devices. Sill more particularly, the present disclosure relates to message and recipient authentication and verification by electronic communication devices configured with mechanisms for capturing biometric input.

2. Description of the Related Art

Personal electronic devices such as smart phones are becoming ubiquitous, as the devices provide a source of entertainment, communication, navigation, and personal assistance. Today's devices can have a number of biometrics technologies, such as imager, fingerprint sensor, voice detection, etc., that are embedded in the devices and which are used for user identification. Often, these personal electronic devices are utilized to generate and communicate messages, such as emails and/or text message, from the device to a recipient. It is expected that these messages would normally be created and/or transmitted by the owner or an authorized user of the device. However, this scenario is not always the case as these devices can occasionally be (i) borrowed by a friend or family member, (ii) lost or stolen, or (iii) subject to third party hacking. In such instances, message generation and transmission is not by the owner or an authorized user, and any type of content can be included in messages that are generated and/or transmitted from the device. Further, a recipient of a message can received a message from a sender known to the recipient but whose identity is being "spoofed" by a malicious third party.

BRIEF DESCRIPTION OF THE DRAWINGS

The disclosure will best be understood by reference to the following detailed description of illustrative embodiments when read in conjunction with the accompanying drawings, wherein.

DETAILED DESCRIPTION

Figure 1:
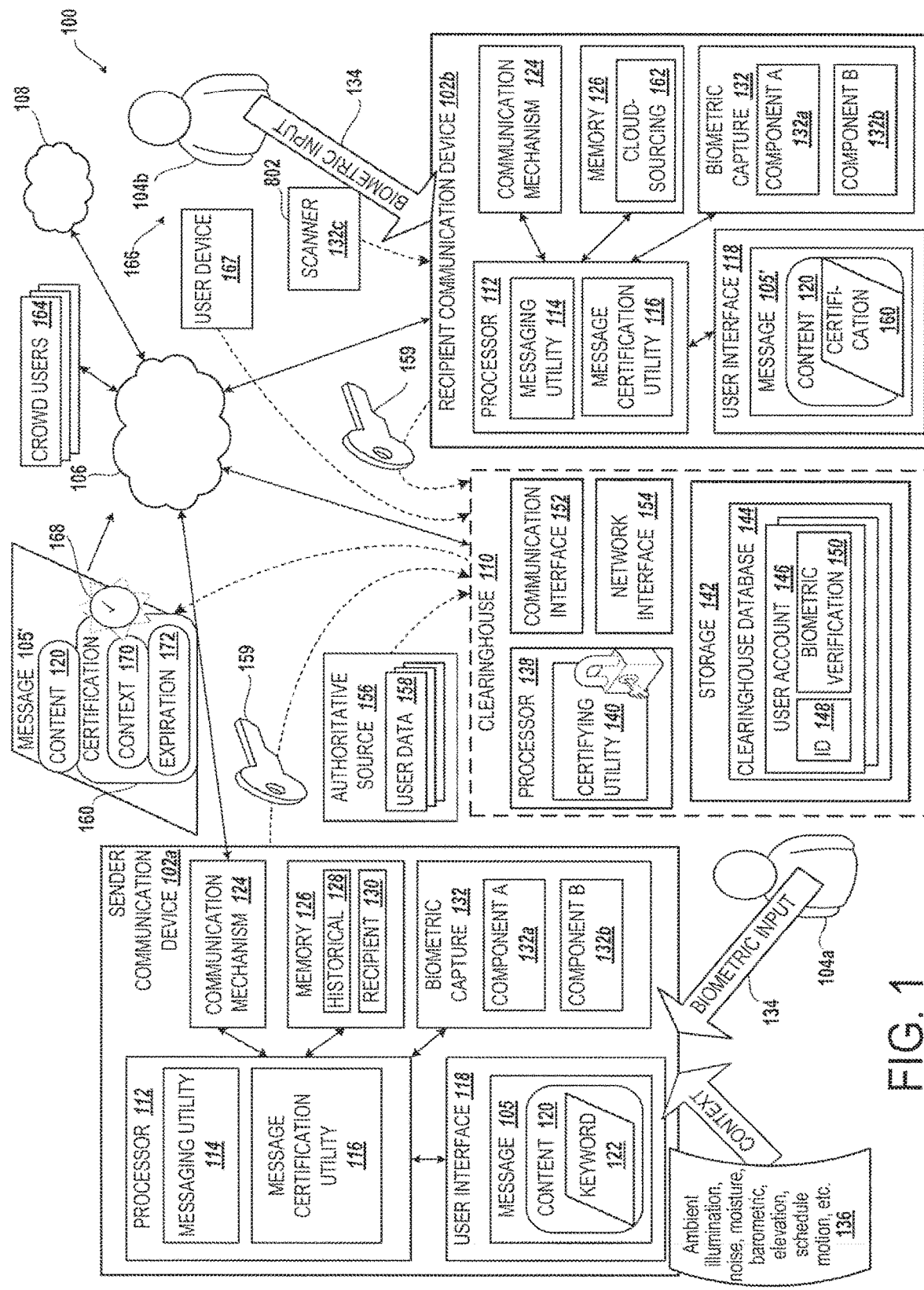
FIG. 1 is a block diagram of an example recipient communication device within a communication environment that supports user authentication of messages, according to one embodiment.

The illustrative embodiments of the present disclosure provide a method and communication device that enables biometric user authentication of a recipient of a message. According to one aspect, the recipient communication device includes: a communication mechanism that enables communicating with a network; at least one biometric capturing component; at least one processor that is communicatively coupled to the communication mechanism and to the at least one biometric capturing component; and a messaging utility that executes on the at least one processor. The messaging utility configures the recipient communication device to: receive a message transmitted from a sender communication device; determine that one of (a) sender authentication of the message and (b) recipient authentication is required to open the message. In response to sender authentication being required, the messaging utility further configures the recipient communication device to: transmit a request to the sender communication device for sender authentication of the message; and receive a certification of the message based upon an authentication of a user input via the sender communication device. In response to recipient authentication being required, the messaging utility further configures the recipient communication device to: prompt for entry of a recipient biometric input; receive the recipient biometric input at the recipient communication device; authenticate the biometric input by one of the messaging utility of the recipient communication device and a verification clearinghouse; and present contents of the message on a user interface of the recipient communication device in response to receiving the recipient authentication. Verification by the clearinghouse is an optional verification process that can be performed in some embodiments.

In at least one embodiment, the present disclosure provides a method for user authentication of a message that is being received by a recipient communication device. The method includes: receiving, by a messaging utility of the recipient communication device, a message transmitted from a sender communication device; the messaging utility determining that one of (a) sender authentication of the message and (b) recipient authentication is required to open the message. In response to sender authentication being required, the method further includes: transmitting a request to the sender communication device for sender authentication of the message; and receiving a certification of the message based on an authentication of a user input via the sender communication device. In response to recipient authentication to open the message being required, the method further includes: prompting for entry of a recipient biometric input; receiving the recipient biometric input at the recipient communication device; authenticating the biometric input by one of the messaging utility of the recipient communication device and a verification clearinghouse; and presenting contents of the message on a user interface of the recipient communication device based on receiving the recipient authentication.

In an alternate embodiment, the present disclosure provides a method for user authentication of a message received by a recipient communication device from a sender communication device. The method includes: receiving a request to authenticate one of (a) a sender identity, (b) a recipient identity, and (c) the message. In response to receiving the request to authenticate one of the sender identity and the recipient identity, the method further includes: selecting information about a corresponding user from an authoritative source; prompting the user to provide an entry of data corresponding to the selected information. In response to receiving, from the user, the data entry that corresponds to the selected information, the method includes authenticating the user and forwarding a certification of the authentication to the recipient communication device. As utilized herein data can be inclusive of biometric information or code.

In one embodiment, a verification clearinghouse server includes: a communication interface that enables communication with a recipient communication device that receives messages transmitted by a sender communication device; a network interface by which the verification clearinghouse server communicates with an authoritative source that provides unique identifying information about one or more users; a processor coupled to the communication interface and the network interface; a storage device coupled to the processor and which includes a certifying utility that executes on processor. The certifying utility configures the verification clearinghouse server to: receive a request to authenticate one of (a) a sender identity, (b) a recipient identity, and (c) the message. In response to receiving the request to authenticate one of the sender identity and the recipient identity, the certifying utility further configures the verification clearinghouse server to: select information about a corresponding user from an authoritative source; prompt the user to provide an entry of data corresponding to the selected information; and, in response to receiving, from the user, the data entry that corresponds to the selected information, authenticate the user and forward a certification of the authentication to the recipient communication device.

As a preface to the disclosure, user authentication based on passwords and biometrics, such as fingerprints, is rapidly becoming a standard practice on handheld and wearable devices. Generally, the authentication is used to secure the content and access privileges of the devices themselves. One aspect of the present disclosure involves extending this authentication capability to provide a level of identity verification for users engaged in social or business interactions across a wide variety of digital domains. Those interactions do not necessarily need to be conducted through the authenticating device either as long the authenticating device is part of an ecosystem of devices and applications associated with the user.

Several different approaches for verification and/or authentication are described within the disclosure, including systems where with the user's permission, a third party verifies the user's identity through a credit reporting agency, government database, credit card company, or other service that crosschecks identities, then associates that identity in a secure fashion with the user's biometric or password data. The user's identity data can then be shared selectively with various counter-parties during—or as a preface to—a digital exchange. The user would authenticate on the device at the time of the interchange and an authentication code would be sent to the counter-party as part of the interchange, such that upon viewing the interchange within a specified time interval the counter-party is provided with identity data on the original party, such as the person's name and/or home city of residence.

As one aspect, the disclosure involves establishing the user's identity through an authoritative source such as banking or government channels and then managing the identity and biometric data to allow future crosschecking. The disclosure also provides for simpler routines that provide a lesser level of identity assurance that may be appropriate for certain types of communication. These simpler routines can include embedding a short video or embedding Global Positioning System (GPS) location data into the correspondence bit stream that can then be decrypted and viewed by the recipient. The various solutions described herein are presented as alternate measures that can be independently applied or can be combined, with the end goal being to prevent or significantly curtail blatant spoofing by individuals claiming to be somewhere or be someone that is inconsistent with their current location, looks, or voice, or other biometrically verifiable characteristics.

In the following detailed description, exemplary embodiments in which various aspects of the disclosure may be practiced are described in sufficient detail to enable those skilled in the art to practice the invention. It is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

Turning now to FIG. 1, there is depicted a block diagram representation of an example message verification and communication (MVC) environment 100 including several user communication devices 102a, 102b and a verification clearinghouse 110 that collectively enable the biometric user authentication of messages and other features of the disclosure. FIG. 1 encompasses embodiments that utilize a verification clearinghouse as well as other embodiments that do not utilize a verification clearinghouse 110. For clarity, the verification clearinghouse 110 is identified with dashed lines rather than solid exterior lines for the remaining blocks to indicate its optional nature. Specifically, MVC environment 100 includes sender communication device 102a and recipient communication device 102b of respective device users 104a and 104b. Both communication devices 102a, 102b are illustrated having similarly internal components that enable message communication (i.e., transmission from sender device and reception by recipient device) over a communication network 106. The internal components also enable the communication devices 102a, 102b to provide message authentication and/or user verification at the respective devices. Specifically, recipient communication device 102b includes the functional components that enable the device user 104b of recipient communication device 102b to be able to (i) authenticate received messages as being generated by the specific authorized device user 104a of the sender communication device 102a and/or (ii) verify that the recipient device user 102b is the intended recipient of the message. Additionally and/or alternatively, in at least one embodiment, recipient communication device 102b is configured to initiate or perform message authentication and/or recipient verification using verification clearinghouse 110, which is accessible to recipient communication device 102b over communication network 106.

According to the general illustration, a device user 104a of sender communication device 102a originates a message 105 that is to be transmitted, or has been transmitted, to a recipient communication device 102b via a communication network 106 in the MVC environment 100. For example, the message 105 can be an email, an audio recording, a multimedia message service (MMS) message, a short message service (SMS) message, initiation of a two-way chat session, or other type of transmittable message. The recipient communication device 102b can be configured to require one or more of: (i) prior sender authentication of (a) certain types of received messages, including an evaluation of context of the messages or (b) messages originating from certain senders or originating from sender devices at certain locations; and (ii) verification of the recipient prior to providing the content of specific messages that are tagged to require such verification. In addition, the recipient communication device 102b interacts with active portions of the authenticated message 105' to present information associated with the user authentication. For example, the sender communication device 102a can self-recognize a need to biometrically authenticate the message 105. In at least one embodiment, the recipient communication device 102b can initiate user authentication of the sender user 104a by the sender communication device 102a. In at least one embodiment, the recipient communication device 102b performs user authentication of the recipient user 104b. For example, the recipient communication device 102b can detect aspects of the message 105 as warranting increased security that prompts a request for biometric authentication to be performed by one or both of the sender communication device 102a and the verification clearinghouse 110. Alternatively, verification clearinghouse 110 can be configured to perform all or part of the authentication before, during, or after message transmission to recipient communication device 102b for either or both of the sender user 104a and the recipient user 104b. The MVC environment 100 can be part of a communication system 108 accessed by other communication devices that do not necessarily cooperate with biometric authentication.

In one embodiment, the recipient communication device 102b can receive the original message 105 without any authentication and prompt the sender communication device 102a to authenticate the message 105. This prompting can be one or more of (a) a default response to receipt of any message 105 that has not been authenticated, where the authentication of the sender (104a) or the received messages is required before allowing the recipient user 104b to access the message 105, (b) a message-specific, automated response triggered by analysis at the recipient communication device 102b of (i) the title and/or content and/or other characteristic (e.g., size) of message 105 or (ii) user 104a of the sender communication device 102a, or (c) a manual user selection by the recipient user 104b of the recipient communication device 102b. Also, the recipient communication device 102b can require the recipient user 104b to be biometrically authenticated as a requirement before accessing the message 105 or before originating a response to the message 105. In certain embodiments, the recipient communication device 102b biometrically authenticates the recipient user 104b or requests biometric authentication of sender user 104a of the sender communication device 102a with the assistance of the verification clearinghouse 110. In response to receiving the authenticated message 105', the recipient communication device 102b can perform one or more of (a) allowing the recipient user 104b to review the authenticated message based on a determination of valid authentication; (b) biometrically authenticating the recipient user 104b of the recipient communication device 102b prior to allowing the recipient user 104b to review the authenticated message 105'; and (c) presenting information (context, authenticating entity) associated with the authentication for subjective evaluation by the recipient user 104b.

The sender communication device 102a includes a processor 112 that executes a messaging utility 114 and a message certification utility 116. A user interface 118 receives and presents the message 105 that is generated and/or transmitted by the sender communication device 102a. The message 105 includes contents 120 that is the primary purpose of sending the message 105. One or more portions of the contents 120, such as keywords 122, can be utilized in analyzing or determining whether message and/or user authentication is needed. A communication mechanism 124 facilitates communication with the network 106 and ultimately with the recipient communication device 102b. A memory 126 is coupled to and used by the processor 112. Memory 126 includes stored data, such as historical data 128 and recipient data 130, used in authenticating the message 105. At least one biometric capturing component 132 receives biometric input 134 from the sender user 104a for authenticating the message 105. For example, the sender communication device 102a can have a biometric capturing component "A" 132a and a biometric capturing component "B" 132b that can be selected for authentication, as deemed appropriate. The message 105 is associated with contextual data 136 that describes the ambient conditions and location of the sender communication device 102a during origination of the message 105.

For embodiments that include the verification clearinghouse 110, the verification clearinghouse 110 can be a network processing device or system. Verification clearinghouse 110 includes a processor 138 that executes a certifying utility 140. Verification clearinghouse 110 also includes storage 142 that contains a clearinghouse database 144 of user accounts 146 having user identifiers 148 and clearinghouse biometric verification inputs 150. Verification clearinghouse 110 further includes a communication interface 152 for communicating with the communication devices 102 and a network interface 154 for communicating with the network 106 and with an authoritative source 156. As illustrated, authoritative source 156 maintains user data 158 that device users 104 can be validated against. The clearinghouse 110 queries the device users 104 and the users respond by sending authenticating inputs 159. The clearinghouse 110 associates biometric inputs 134 with the user 104 in conjunction with the user validation. In future interactions, the communication device 102 can transmit authenticating inputs 159 that convey biometric inputs 134 for validating against clearinghouse biometric verification inputs 150 at the verification clearinghouse 110. Alternatively, there may be instances in which the user 104 can validate against the user data 158 rather than the clearinghouse biometric verification inputs 150, such as when unable to provide a biometric input 134.

In one embodiment, the verification clearinghouse 110 may be the entity that associates the biometric inputs 134 with the user 104. Alternatively, the authoritative source 156 may maintain the clearinghouse biometric verification inputs 150 for access by, or for transfer to, the clearinghouse 110. A first interaction of the user 104 with the clearinghouse 110 can be made with a biometric input 134. The verification clearinghouse 110 can select information about a corresponding user from an authoritative source 156 that may include clearinghouse biometric verification inputs 150 or a code that represents the information contained in the clearinghouse biometric inputs 150. The verification clearinghouse 110 subsequently prompts the user to provide an entry of data corresponding to the selected information. For example, the user 104 may input a biometric input 134 that is transmitted to the clearinghouse 110. Alternatively, the sender communication device 102a may analyze the biometric input 134 for information and transmit this information in the form of a code to the clearinghouse 110. Thus, the comparison of the received biometric input 134 against clearinghouse biometric verification inputs 150 of registered users may also be a one-on-one comparison of a known user against a stored template or code. If no match is found, then the user can be deemed as not authenticated.

Centralizing this authentication function at the verification clearinghouse 110 can provide certain advantages, such as reducing computational requirements for the communication devices 102a, 102b, increasing the subjective confidence in the authentication by the recipient user 104b, and/or leveraging user data 158 maintained about the users 104 by the authoritative source 156 to objectively obtain a higher degree of confidence in the identity of the relevant device user 104a or 104b. It should be appreciated that this list of advantages is neither all inclusive nor necessarily realized in each embodiment.

The recipient communication device 102b can be a processing device having a processor 112 that executes a message utility 114 and a message certification utility 116. In one embodiment, the recipient communication device 102b is configured to act as a sender communication device 102a as well. A user interface 118 receives and presents the message 105 from the sender user 104a. The message 105 includes contents 120 that can be analyzed for determining whether authentication is needed. The message 105 can also include evidence of authentication in the form of a certification 160. A communication mechanism 124 facilitates communication with the communication network 106 and ultimately with the sender communication device 102a. A memory 126 is used by the processor 112 and includes stored data used in determining a need for authenticating the message 105, such as cloud sourced data 162 received from crowd users 164. At least one biometric capturing component 132 receives biometric input 134 from the recipient user 104b for being able to review the message 105 or respond to the sender communication device 102a. For example, the sender communication device 102a can have a biometric capturing component "A" 132a and a biometric capturing component "B" 132b that can be selected as deemed appropriate for authentication. The recipient communication device 102b can be one device in an authentication ecosystem 166 used by the recipient user 104b, such as a user device 167 that is used in setting up a user account 146 with the verification clearinghouse 110 and another user device illustrated as a scanner 132c that can provide the biometric input 134, or perhaps authenticate the biometric input 134, for the recipient communication device 102b.

In one embodiment, the messaging utility 114 configures the recipient communication device 102b to: receive a message 105 transmitted from the sender communication device 102a; determine that one of (a) sender authentication of the message 105 and (b) recipient authentication is required to open the message 105. The messaging utility 114 further configures the recipient communication device 102b to: in response to sender authentication being required: transmit a request to the sender communication device 102a for sender authentication of the message 105; and receive a certification 160 of the message 105 based upon an authentication of a user input via the sender communication device 102a. Further, the messaging utility 114 configures the recipient communication device to: in response to recipient authentication being required to open the message 105: prompt for entry of a recipient biometric input 134; receive the recipient biometric input 134 at the recipient communication device 102b; authenticate the biometric input 134 by one of the messaging utility 114 of the recipient communication device 102b and a verification clearinghouse 110; and present contents 120 of the message 105 on a user interface 118 of the recipient communication device 102b based on receiving the recipient authentication.

Alternatively to receiving the authentication itself, the messaging utility 114 can receive a notification that the sender user 104a has provided a biometric input 134 that has been verified at one of the sender communication device 102a and a verification clearinghouse 110 as belonging to the sender 102a. In a particular embodiment, the messaging utility 114 can receive the certification of the message 105 by the verification clearinghouse 110 that verifies an identity of a sender user 104a of the message 105. The clearinghouse can verify the identity based on receiving from the sender a data entry that corresponds to identifying information of an authoritative source 156. In another embodiment, the messaging utility 114 can receive a copy of an image of the sender user 104a taken at the sending communication device 102a in response to the required sender authentication being capture of a photograph at the sender communication device 102a as a biometric input 134. The copy of the image is displayed on the recipient communication device 102b.

The messaging utility 114 can further receive, as components of the message 105 transmitted from the sender communication device 102a, both (a) content 120 of the message 105 and (b) certified context 170 associated with the sender communication device 102a. The messaging utility 114 of the recipient communication device 102b can analyze the content 120 as disclosed herein for when user authentication is warranted due to suspicious aspects. If available, the messaging utility 114 can determine whether the certified context 170 of the sender communication device 102a can be relied on as validly certified. The messaging utility 114 can further determine whether the certified context 170 can be a basis for determining the need for user authentication, such as based on the contextual information alone or in comparison to the content 120. For example, the sender communication device 102a can be in a location that is infrequently visited by sender user 104a, a fact that is known to the recipient user 104b. In one or more embodiments, the requirement for the recipient user 104b to authenticate may also be based upon the recipient communication device 104b being in a location that is infrequently visited by the recipient user 104b. In this example, location can present a credibility comprising factor for the message 105. Alternatively, the recipient communication device 102b can present the certified context 170 to the recipient user 104b for a subject determination of whether user authentication is warranted.

Thus, in one embodiment the messaging utility 114 can determine that sender authentication of the message 105 is required by: identifying a credibility compromising factor associated with at least one of (a) the message content 120 and (b) the certified context 170 associated with the sender communication device 102a; and determining that the message 105 requires user authentication based on the identified credibility compromising factor being at least a threshold value. In a particular aspect, the credibility compromising factor can be at least one of (i) a monetary value included within the content 120 of the message 105 exceeding a pre-set threshold: (ii) a location indicated for the sender communication device 102a that is pre-established as unexpected for all users; or (iii) a location indicated for the sender communication device 102a that is unexpected for the particular user. A pre-established location can be suspicious for a population of recipient users 104b. By contrast, an unexpected location can be specific to a particular recipient user 104b. The messaging utility 114 can determine that a selected location is unexpected based on data accessible to the recipient communication device 102b for a sender user 104a of the message 105. For example, the sender user 104a is at a location from which no previous message 105 has been sent. For another example, the messaging utility 114 can access personal appointment data that indicates that the sender user 104a should be at another location.

In one embodiment, a certifying utility 140 of a verification clearinghouse 110 receives a request to authenticate one of (a) a sender identity. (b) a recipient identity, and (c) the message 105. In response to receiving the request to authenticate one of the sender identity and the recipient identity, the certifying utility 140 selects information about a corresponding user from an authoritative source 156. The certifying utility 140 prompts the user 104 to provide an entry of data corresponding to the selected information. In response to receiving, from the user 104, the data entry that corresponds to the selected information, the certifying utility 140 authenticates the user 104 and forwards a certification 160 of the authentication to the recipient communication device 102b.

By benefit of the authentication facilitated by the MVC environment 100, the message 105 and its content 120 can become an authenticated message 105'. A certification token 168 can be included as evidence of user authentication. For example, the certification token 168 can include the identity of the authenticating entity to bolster confidence in the authentication. For example, the authenticating entity can be the message certification utility 116 of the sender communication device 102a. For another example, the authenticating entity can be the verification clearinghouse 110. For example, the certification token 168 can be digitally encrypted and signed in order to reliably convey the identity of the authenticating entity. The certification token 168 of the authenticated message 105' can include a certified context 170 associated with one or more of the device user 104a and the contextual data 136 of the sender communication device 102a. The context is certified in that it does not originate from the sender user 104a but has been incorporated by the authenticating entity. The certification token 168 can include at least one expiration criterion 172. For example, the certification token 168 can be provided for the purpose of an exchange of messages during a finite period of time. User authentication can be periodically re-accomplished to confirm that the sender user 104a continues to maintain control of the sender communication device 102a.

Figure 2:
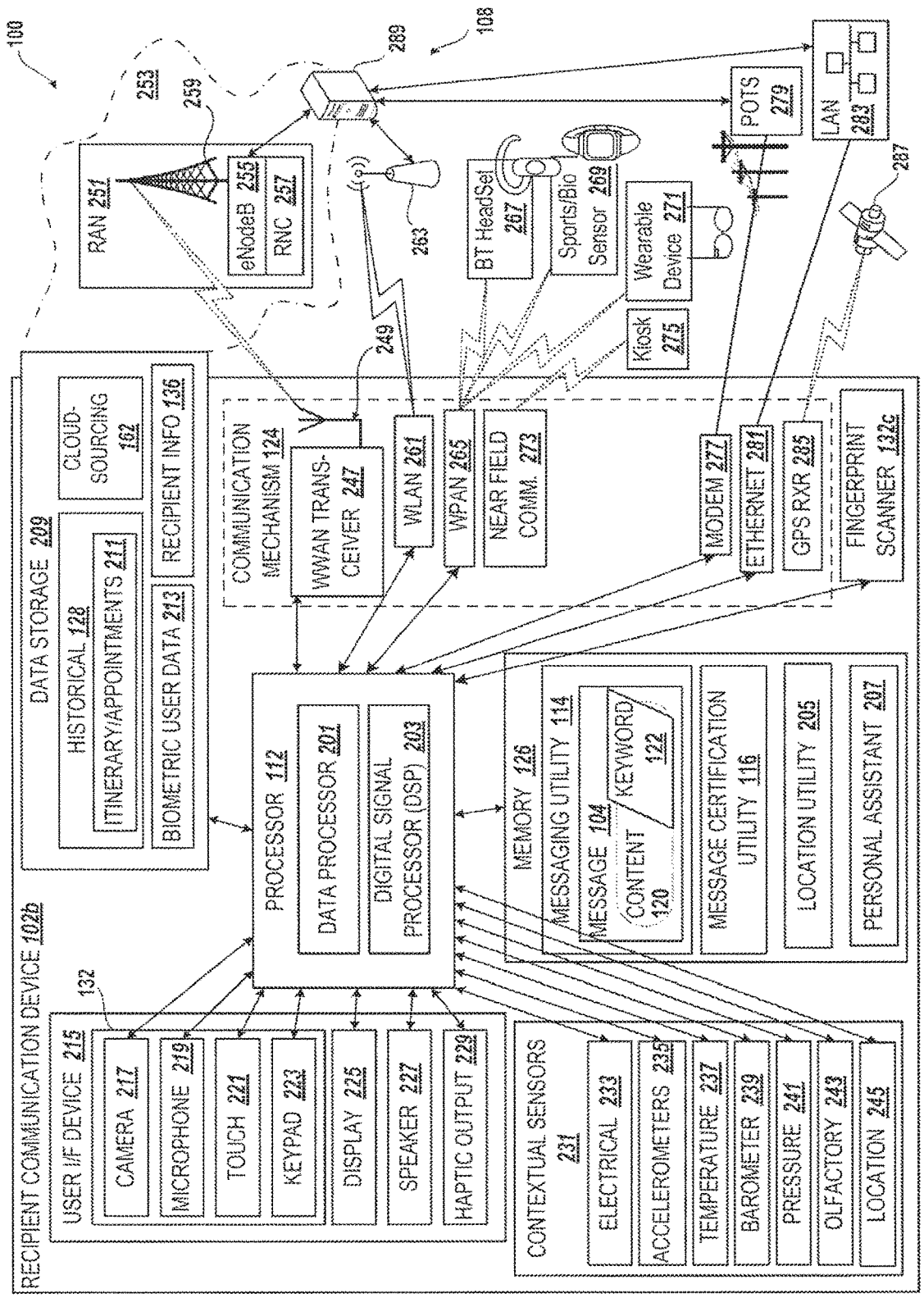
FIG. 2 is a detailed block diagram of the example recipient communication device of FIG. 1, according to at least one embodiment.

Referring now to FIG. 2, the component makeup and the associated functionality of the presented components are shown for the MVC environment 100. Recipient communication device 102b can include an integrated circuit (IC) processor 112, which connects via a plurality of bus interconnects (illustrated by the bi-directional arrows) to a plurality of functional components of the recipient communication device 102b. The recipient communication device 102b can be one of a host of different types of devices, including but not limited to, a mobile cellular phone or smart-phone, a cordless phone, a desktop computer, a laptop, a net-book, an ultra-book, and/or a tablet computing device. The various devices provide and/or include the necessary hardware and software to support the various wireless or wired communication functions as part of a MVC environment 100.

Processor 112 can include one or more programmable microprocessors, such as a data processor 201 and a digital signal processor (DSP) 203, which may both be integrated into a single processing device, in some embodiments. The processor 112 controls the communication, user interface, and other functions and/or operations of recipient communication device 102b. These functions and/or operations thus include, but are not limited to, application data processing and signal processing. The present innovation can be implemented using hardware component equivalents such as special purpose hardware, dedicated processors, general purpose computers, microprocessor based computers, micro-controllers, optical computers, analog computers, dedicated processors and/or dedicated hard wired logic.

Memory 126 is connected to processor 112 and can include volatile memory and/or non-volatile memory. One or more executable applications can be stored within memory 126 for execution by data processor 201. For example, memory 126 is illustrated as containing a messaging utility 114 and a message certification utility 116. In at least the illustrated embodiment, memory 126 also contains a location utility 205 for determining contextual data 136 for location. The associated functionality and/or usage of each of the software modules will be described in greater detail within the descriptions which follow. In particular, the functionality associated with message certification utility 116 is described in greater detail within the description of the flow charts of FIGS. 5-7, and other figures. Memory 126 can also contain a personal assistant utility 207.

A data storage device 209 is coupled to processor 112. Storage device 209 can be any type of available storage device that is integral, attachable or insertable and capable of storing one or more application software and data. The personal assistant utility 207 can interact with historical data 128, such as itinerary and appointments data 211 stored in the data storage device 209 along with biometric user data 213, recipient data 130, and cloud sourced data 162. It is further appreciated that in one or more alternate embodiments, the data storage device 209 can actually be remote storage and not an integral part of the recipient communication device 102b itself. The specific usage and/or functionality associated with these components are described in greater detail in the following descriptions.

Figure 3:
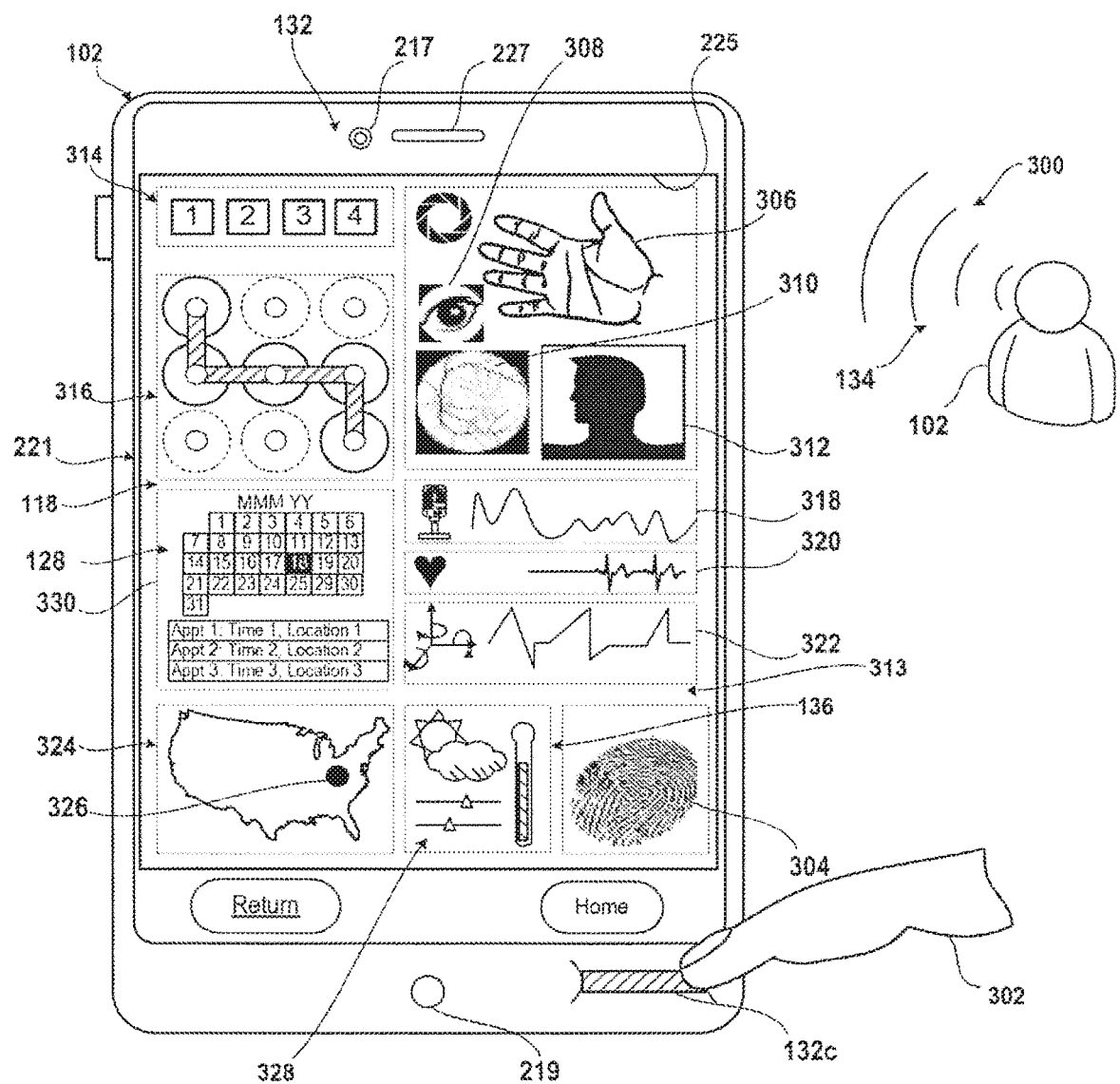
FIG. 3 illustrates an example user interface of the recipient communication device of FIG. 1 having multiple biometric certification components, according to at least one embodiment.

The contextual situations can include contextual data associated with the recipient communication device 102b, such as the location of the recipient communication device 102b, the ambient weather conditions surrounding the device, and others. In response to a determination that authentication is required, the communication device recipient communication 102b can automatically capture biometric input of the user of the recipient communication device 102b without the user's assistance. For example, the recipient communication device 102b can perform facial recognition based upon the user's face being within the focal plane of the lens of the camera 217 (FIG. 3). For another example, the communication device 100 can perform voice recognition based upon a spoken input by the user 104. In situations where user cooperation is required to obtain a biometric input, a notification is generated to prompt the user to provide the biometric input that is selected as appropriate based upon contextual data. For example, a fingerprint scanner can require a particular technique of swiping or touching a finger across a linear surface.

In certain situations, the recipient communication device 102b can proactively determine, based upon contextual data, that a particular biometric input 134 cannot be automatically obtained and that prompting the user will not allow for the particular biometric input to be effectively obtained. For example, ambient conditions can preclude the efficacy of certain biometric inputs 134 and the selection of a different biometric input 134 is desired. For example, a touch screen or touch pad 221 can rely upon a capacitive characteristic of the user's hand that is detectable in dry ambient conditions, but which capacitive characteristic would not be detectable in moist ambient conditions. As another example, contextual data can relate to physiological or movement data indicating that the user 104 is engaged in an activity that makes it inconvenient or unsafe for the user to provide a particular biometric input. If the recipient communication device 102b detects that the user 104 is driving, for example, the communication device would preclude hands-on inputs or facial recognition input as the authentication methods. Thus, in one embodiment, the selection of a specific biometric capturing component 132 can consider what is efficacious. Other examples may include an ambient level of noise or light that renders certain biometric capturing components 132 unable to obtain a biometric input 134.

The recipient user 104b may not be able to discern the credibility of the message 105 from its unauthenticated and uncorroborated contents 120 alone. In fact, the contents 120 can create doubt of authenticity. For example, the fact that a co-worker makes a plea for money from an exotic location can actually be truthful even though such messages are frequently scams. In at least one embodiment, the recipient user 104b can be aware in advance that the sender's communication device 102a determines whether authentication is required, and that the sender's communication device 102a transmits in such an instance only after one or more biometric inputs have been authenticated. Thus, receiving the authenticated message 105' on the recipient device 102b can be evidence of authentication. However, in many communication systems 108, spoof messages can be received along with authenticated messages 105' so a higher degree of credibility is desired. To that end, the certification 160 that accompanies the authenticated message 105' can convey confidence in the authentication. Alternatively, the certification 160 can include the biometric input or the contextual data that allows a recipient to also validate the authenticated message 105'.

With reference to FIG. 2, recipient communication device 102b includes input/output (I/O) devices 215 for interacting with the recipient user 104b. The I/O devices 215 can include one or more input devices, such as camera 217, microphone 219, touch screen and/or touch pad 221, and keypad 223. The touch screen and/or touch pad 221 can further include a fingerprint scanner 132c or this can be a discrete component. The user interface device(s) 215 can also have one or more output devices, such as display 225, speaker 227, and haptic output device 229. The input devices can serve as biometric capturing components 132. For example, the camera 217 can perform recognition of a face, iris, eye veins, or retina, or their combination. Recognition of the biometric characteristic or pattern may be based upon matching of key points relative to one another and/or color matching. For another example, the microphone 219 can perform voice recognition. In addition, the user can enter a key code via the touch screen or touch pad 221, keypad 223, or microphone 219. These inputs can be received in response to a user prompt or can be accomplished in the background, such as by an always-on voice capability or an always-on camera capability.

The recipient communication device 102b includes at least one contextual sensor 231, such as an electrical sensor 233 that detect physiological signals, accelerometers 235 to detect motion, a temperature sensor 237, a barometer 239, pressure (grip) sensor 241, and olfactory (smell) sensor 243, or location sensor 245.

The communication mechanism 124 can support one or more modes of communication in order to transmit or receive the message 105. To support wireless communication, recipient communication device 102b can include one or more communication components, including wireless wide area network (WWAN) transceiver 247 with connected antenna 249 to communicate with a radio access network (RAN) 251 of a cellular network 253. The RAN 251 is generally represented as including a base station, depicted as an evolved base node ("eNodeB") 255 controlled by a radio network controller (RNC) 257 that transceives over a base station antenna 259. For clarity, one connected antenna 249 of the recipient communication device 102b is depicted. However, the recipient communication device 102b may contain more than one antenna, each antenna having one or more selected bandwidths of operation to support different modes of communication or for simultaneous communication in different communication technologies.

Alternatively, or in addition to a WWAN transceiver 247, recipient communication device 102b can include a wireless local access network (WLAN) module 261 to communicate with wireless devices and network accessible via a wireless access point 263. As an example, the WLAN module 261 may support IEEE 102.11 standards to detect that wireless access point 263 is a WiFi hotspot. Alternatively or in addition, the recipient communication device 102b can include a wireless personal access network (WPAN) transceiver 265 for communication with WPAN devices, depicted as a Bluetooth® headset 267, a sports/biometric/physiological sensor 269, and a wearable device 271 (multi-function watch, heads up display, etc.). WPAN can include technologies such as Infrared Data Association (IrDA) standard, Wireless Universal Serial Bus (USB), Bluetooth®, Z-Wave, ZigBee, Body Area Network, and ANT+. One or more of these WPAN devices can provide contextual data such as by relaying ambient conditions sensed by another device. Alternatively or in addition, the recipient communication device 102b can include a near field communication (NFC) transceiver module 273, such as can be utilized for exchanging files with another user device or a payment kiosk 275. As further illustrated, recipient communication device 102b can also include components for wired communication, such as modem 277 for communicating over a plain old telephone system (POTS) 279 and Ethernet module 281 for connecting to a local area network (LAN) 283.

A global positioning system (GPS) receiver (RXR) 285 of the communication mechanism 124 can receive signals from GPS satellites 287 in order to provide location as contextual data. Alternatively or in addition to GPS, the communication mechanism 124 can provide a location service by triangulating from one or more RANs 251. Alternatively or in addition, location service by the location utility 205 can be provided by "sniffing" small coverage area cells such as one or more wireless access points, femtocells, relays, etc.

Certain functions described herein can be performed remote from the recipient communication device 102b over the communication network 106. For example, clearinghouse and authentication functions can require processing capabilities or access that are performed by one or more networked devices, depicted as network server 289. In the illustration depicted, the network server 289 is connected to the cellular network 253, wireless access point 263, POTS 279, and LAN 283. However, it should be appreciated that such distributed processing can be accessed over one or other combinations of access networks.

FIG. 3 illustrates an example recipient communication device 102b that can be configured to select among multiple biometric capturing components 132 based on contextual data. The device user 104 can provide a biometric input 134 in one or more input devices. Biometric capturing components 132 can automatically obtain the biometric input 134, such as the camera 217 capturing an image of the device user 104 when in view. Alternatively, displayed or spoken prompts from either the display 225 or speaker 227 respectively can cause the device user 104 to provide the biometric input 134. The device user 104 can provide biometric input 134 by audio (voice) 300. The device user 104 can also provide biometric input 134 by touch as illustrated by user's finger 302 on a discrete fingerprint scanner 132c. Alternatively, a fingerprint 304 can be obtained on a touch screen or touch pad 221. The device user 104 can also provide biometric input 134 that is an image (visual, infrared, capacitive, etc.), illustrated as a number of images or videos for a palm 306, an eye (iris, blood vessels, eye veins in the whites of the eye) 308, a retina 310, or a face 312. Further, the biometric capturing components 132 may also utilize infrared (IR) light in conjunction with an imager for a palm vein or finger vein recognition, or improved face and eye biometrics under differing ambient light conditions and at night. For clarity, visual feedback 313 can be given to the device user 104 so as to convey what biometric input 134 has been received by the recipient communication device 102b.

The camera 217 can also detect contextual data such as being obscured by clothing or otherwise encased. As yet another example, an ambient light sensor (not shown), proximity detector (not shown), accelerometers 235 (FIG. 2) or gyroscopic inertial platform (not shown) can detect characteristics of being in a pocket. The user interface 118 can receive tactile inputs as biometric inputs 134 such as a password or Personal Identification Number (PIN) 314 and a touch pattern 316. In one or more embodiments, the microphone 219 receives audio (voice) 300 in order to perform voice recognition 318 or to accept an audible version of the PIN 314. Alternatively or in addition, the electrical sensor 233 (FIG. 2) can detect a heart signature 320. As another example, when the recipient communication device 102b is placed close to the ear of the device user 104, visual or infrared (IR) imaging of the ear can yield biometric inputs. The example recipient communication device 102b also depicts contextual data 136 upon which a selection of an appropriate biometric capturing component 132 can be based. The contextual data 136 can also provide a basis for determining a requirement to authenticate the message 105. In certain embodiments, the recipient communication device 102b can access the accelerometers 235 (FIG. 2) to detect motion indicative of user activity, as depicted at graph 322. Gait detection can be performed and can be different based upon the environment. Tremble detection imparted by holding the recipient communication device 102b can convey contextual information about the activity. A location service depiction 324 illustrates a current location 326 of the recipient communication device 102b. A weather tracking utility 328 either receives local weather based upon current location 326 or senses the weather directly (e.g., barometric pressure, temperature, moisture, relative humidity, etc.) in the ambient environment. Historical data 128, which can include appointment calendar 330, can be used in comparison to location or other data to determine a context. The historical data 128 also includes user patterns, routes, and typical times associated with those data points.

Figure 4:
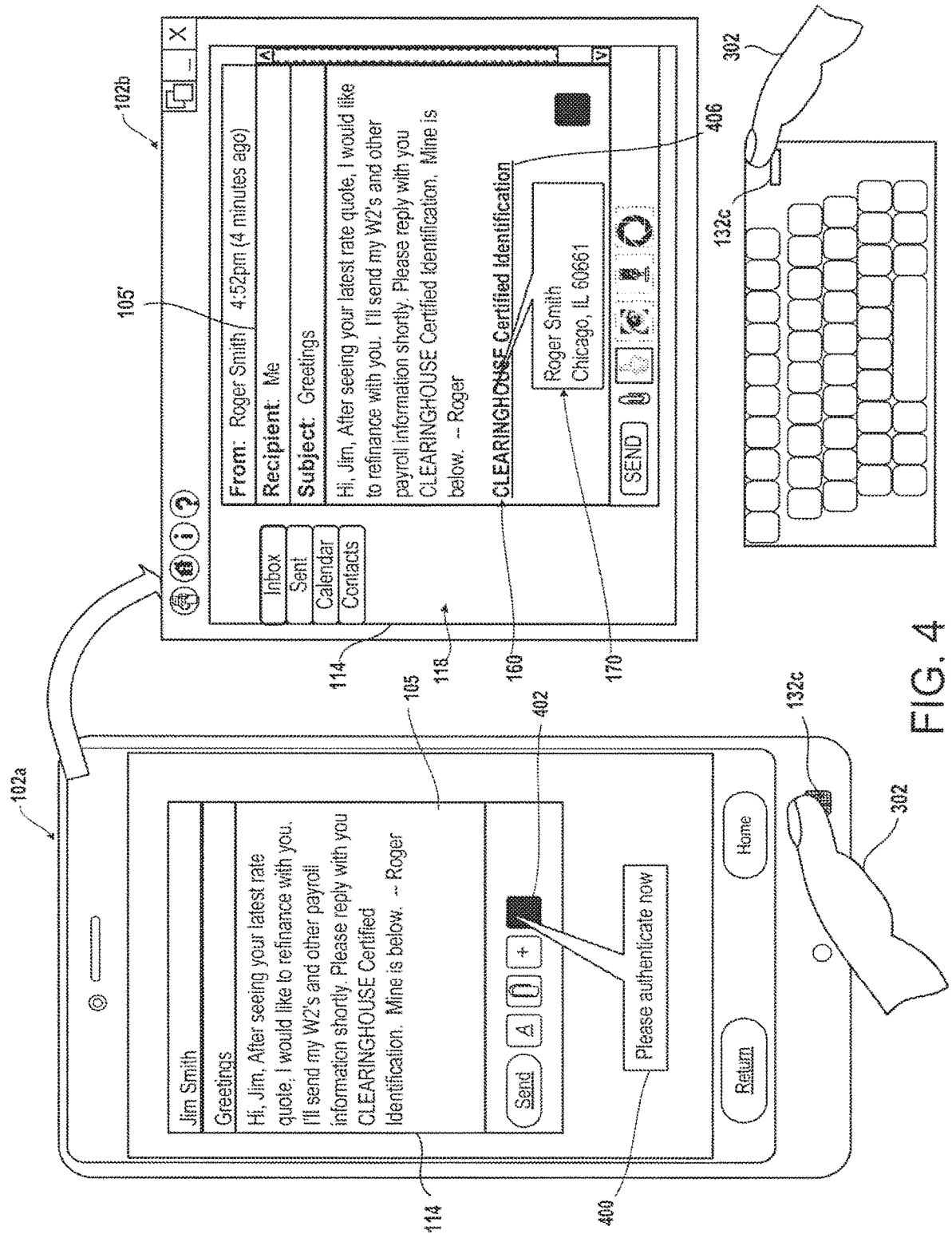
FIG. 4 illustrates a graphical depiction of user interfaces of a sender communication device and a recipient communication device, according to one embodiment.

FIG. 4 illustrates an example message 105 as provided on the user interface 118 of the sender communication device 102a during message origination and prior to message authentication. FIG. 4 also depicts an authenticated message 105' as provided on the user interface 118 of the recipient communication device 102b. A notification 400 and an indication 402 are provided on the user interface 118 of the sender communication device 102a to inform the sender user 104a of an appropriate biometric input 134 to provide. These promptings can be in response to a request from the recipient communication device 102b that determines the need for authentication. In response, the sender user 104a provides a corresponding biometric input 134, illustrated as user's finger 302 interacting with the fingerprint scanner 132c on the sender communication device 102a. However, other forms of biometric certification could be used as well, as indicated in FIG. 3.

As shown within authenticated message 105' and in accordance with one or more embodiments, the certification 160 can be interactive in a received authenticated message 105'. For example, the recipient user 104b can be provided with a clickable link 406 within the message 105'. Then, when the user selects the link, the recipient is provided with the name and address of the sender user 104a as certified context 170. In the context of this dialog, the recipient user 104b can be requested to reply-in-kind to validate his/her identity, in one or more embodiments.

According to one embodiment, the certified context 170 can rely on location alone as a validation method, without user authentication. Thus, the certified context 170 may not necessarily include a direct tie to a name or mailing address of the sender user 104a. In addition, the certified context 170 may not even be a biometric input 134 such as a fingerprint. In this scenario, the sender communication device 102a or clearinghouse 110 can validate the location from which the message originated without a requirement that a sender user 104a be pre-registered with a clearinghouse 110. When the sender user 104a selects an option to use location validation, the location of the sender user 104a is captured and embedded in the authenticated message 105' at that instant the message 105' is being sent. The authenticated message 105' and location data can be encrypted together. A link can then be offered to the recipient user 104b, who can click the link to see where the sender communication device 102a was at the moment the authenticated message 105' was sent from the sender communication device 102a. For example, a map can be presented to provide location information. Although a precise address is possible with Global Positioning System (GPS), the city or zip code may be transmitted instead to offer a degree of privacy. For example, the recipient user 104b may receive a sufficient level of assurance by knowing the city from which the sender user 104a is transmitting the authenticated message 105'.

Similarly, the certified context 170 can provide a level of validation via an image or video taken with a front-facing imager of the sender communication device 102. For example, the sender user 104a can opt to allow certification by having an image taken and encrypted in an inseparable fashion with the authenticated message 105' such that the recipient user 104b could view the just-taken image. In the case of a video capture, the sender user 104a could furthermore be shown a random phrase to speak and the phrase provided within the certified context so that the phrase can be viewed along with the video on the recipient device. The use of the phrase as a part of the certified context 170 would make it more difficult to pre-record the video and spoof the system. In some instances, the recipient user 104b may be able to discern that an included image or video of the face of the sender user 104a is new and not an outdated image or video or one from another individual to provide a sufficient level of assurance. It is appreciated that a combination of certified context 170 and identity authentication can provide a more secure option. The recipient user 104b can click a link to get one or more of a name, mailing address, city, current image or video, and current location city (or even a map snapshot thereof) of those attempting to contact or associate with them.

In an exemplary embodiment, both the sender user 104a and the recipient user 104b (collectively user 104) can set up user authentication prior to composing the message 105. To that end, either user 104 logs into a website, which can be either a distinct separate site or the user's existing internet email account that has been enhanced to enable the authentication feature. At the website or within the email account, the user 104 is presented with an option to establish a Certified Clearinghouse account. The clearinghouse 110 can validate the user 104 by querying for user data. As a part of the sign-up process, the user 104 can be asked to provide a biometric input 134, such as a fingerprint that is then associated with the user account. The fingerprint or other biometric input 134 can be obtained from a device that is linked or can be linked to an Internet messaging account. For example, the user 104 can complete the fingerprint scan on a cell phone that is also linked to the messaging account. The received fingerprint data is encrypted and sent to the clearinghouse server, where the server associates the fingerprint with the created account of the user 104. The data can also be represented by a code. This use of code data can be required or implemented, for example, in locations where local laws prevent use of biometric data on servers.

With the certified account established and made accessible from the user's communication device 102, when the user 104 next sends an email or SMS/MMS, initiates an online chat session, invites a person to an online forum, opens or joins an online social venue, etc., or responds to such interactions, the user 104 can be given the option of using "Certified Clearinghouse Identity". If the user 104 selects this option, the user 104 is prompted to perform a scan of a portion of their body such as a fingerprint, face, eye vein, palm vein, finger vein, retina, etc. and/or provide other biometrics characteristics immediately after hitting the send button. The fingerprint data may be encrypted together with the message content to make hacking or separating of the two data types more difficult. The fingerprint data is then extracted at the clearinghouse server and compared with the fingerprint data on file. If the data matches, then recipients of these messages get a verified tag with the message or receive a "Certified Clearinghouse Identity" link along with the message. When a link is provided, the recipients can select the link to view select information with the sender, such as the name and perhaps city and address associated with the Wallet account. Subscribers can also request that recipients reciprocate with their certification link to assure the sender user 104a that the correct recipient user 104b has received the message and/or to be able to open and view the actual content of the incoming message.

Prior to receiving biometric inputs 134 for message authentication from the either the sender or recipient communication devices 102a, 102b, the verification clearinghouse 110 can receive a request to create a user account 146 for the user 104. The request can be made from communication device 102 or another user device, such as a personal computer. In response to receiving the request, the certifying utility 140 can select or request information about the user 104 from the user data 158 within the authoritative source 156, accessible via the network interface 154. The certifying utility 140 can prompt the user 104 (via the communication interface 152) to provide an entry of data corresponding to the selected information. In response to the verification clearinghouse 110 receiving, from the user 104, the data entry that corresponds to the selected information, the certifying utility 140 can prompt the user to submit one or more clearinghouse biometric verification inputs 150. The certifying utility 140 can associate the submitted clearinghouse biometric verification inputs 150 with a user identifier 148 assigned to the user 104. The certifying utility 140 can store the clearinghouse biometric verification inputs 150 and user identifier 148 within the clearinghouse database 144 for future access by the user 104. Alternatively, the verification data can also be represented by a code in locations where local laws prevent use of biometric data on servers or where otherwise efficacious for network throughput and storage. The future access can require that the user 104 user-authenticate a message 105 via the communication device 102.

In particular, the verification clearinghouse 110 can subsequently receive a biometric input 134 from the communication device 100 and compare the received biometric input 134 against clearinghouse biometric verification input/s 150 of registered users in order to authenticate a user 104 of the communication device 102. In response to authenticating the user 104, the certifying utility 140 of the verification clearinghouse 110 generates and transmits a certification token 168 to the communication device 102 for inclusion in the authenticated message 105' being transmitted by the communication device 102 to the recipient communication device 102b.

In one aspect, authentication of a biometric input 134 can be wholly performed at the verification clearinghouse 110 with the processing performed by the communication device 102 being confined to capturing the biometric input 134. Alternatively, certain biometric capturing components 132 can require a two-part authentication process with a first image analysis portion performed on the communication device 102 and a second matching portion performed by the verification clearinghouse 110. Biometric inputs 134 can be analyzed on the communication device 102 in order to extract characteristics that uniquely identify the biometric input 134. Transmitting and storing only these characteristics can reduce a quantity of resources consumed by the authentication environment. For example, correlating a two dimensional image corresponding to a fingerprint, retina, face, iris, eye vein, palm & palm vein, finger vein, etc., can, in the first instance, be performed at the verification clearinghouse 110. In the second instance, the communication device 102 can extract the essential, distinguishing features of the biometric input 134 that correspond to like features tracked by the verification clearinghouse 110.

Consider as an illustration, use of fingerprint scanners. Matching algorithms can be used to compare previously stored templates of fingerprints against candidate fingerprints for authentication purposes. In order to do this, the original image or certain features thereof can be directly compared with the candidate image. Pattern based algorithms compare the basic fingerprint patterns (arch, whorl, and loop) between a previously stored template and a candidate fingerprint. This can require that the images be aligned in the same orientation. To do this, the algorithm finds a central point in the fingerprint image and centers on that point. In a pattern-based algorithm, the template contains the type, size, and orientation of patterns within the aligned fingerprint image. The candidate fingerprint image is graphically compared with the template to determine the degree to which they match and a match score is generated. Other algorithms can use minutiae features on the finger.

The major minutia features of fingerprint ridges are: ridge ending, bifurcation, and short ridge (or dot). The ridge ending is the point at which a ridge terminates. Bifurcations are points at which a single ridge splits into two ridges. Short ridges (or dots) are ridges which are significantly shorter than the average ridge length on the fingerprint. The communication device 102 can analyze the scanned fingerprint to detect the presence of minutiae and patterns. The resulting authentication confirmation code can transmitted to the verification clearinghouse 110 for association. Thereby, the MVC environment 100 can provide throughput increases as well as expanding the range of devices that a user 104 may use with benefits of authentication.

In one embodiment, the biometric capturing component 132 of the communication device 102 is a scanner that captures the corresponding biometric input 134 comprising a pattern from a portion of the body of the user 104 of the communication device 102. In the illustrated example, the optical scanner is a fingerprint scanner 132c, which captures a finger print image. As a non-exclusive list of other examples of biometric inputs involving the user's body, the captured image can include the user's face, retina, iris, eye vein, palm vein, and finger vein and/or other biometrics characteristics. The fingerprint scanner 132c of the communication device 102 generates an authentication confirmation code based upon the upon successful match of fingerprint image with stored template. This code may also be generated by the communication device 102 following synchronization or a match of on-device coding with coding stored at the clearinghouse 110. Thereby, transmission efficiency can be realized by downloading coding of previous users of the communication device 102 in advance. The pattern can be detected in different areas of the electromagnetic spectrum (e.g., visual, optical, infrared, etc.) or be based on electromagnetic fields (e.g., capacitance). The pattern may be two-dimensional or include variation over time (e.g., audio, electrocardiogram). The authentication confirmation code incorporates information about pattern and minutiae features detected by the fingerprint scanner 132c. The verification clearinghouse 110 receives the authentication confirmation code as an authenticating input 159 that is forwarded by the communication device 102. The verification clearinghouse 110 performs an association of the received biometric input 134, which comprises the authentication confirmation code, to authoritative information associated with the user 104. The authoritative information can be user data 158 from the authoritative source 156 or the clearinghouse biometric verification inputs 150. The verification clearinghouse 110 provides an authentication, such as the certification 160 or certification token 168, in response to the association being successful. In turn, the communication device 102 can receive authentication of the user 104 from the verification clearinghouse 110 and transmit the authenticated message 105' in response to receiving the authentication.

The certifying utility 140 of the verification clearinghouse 110 can incorporate mitigation for a user 104 that loses control of the communication device 102 after the biometric input 134 is input. For example, the verification clearinghouse 110 can embed an expiration criterion 172 with the certification token 168 that dynamically invalidates the certification token 168 based on an occurrence of one of more pre-established conditions at one of the communication device 102 and the recipient communication device 102b. For example, a pre-established condition can require that the transmitted time-date stamp for an authenticated message 105' must be within a certain time interval from when the verification clearinghouse 110 generated the certification token 168. As another example, the pre-established condition can require that the user 104 maintain control of the communication device 102 between the times of the request for authentication until the time of a second event such as transmission of the authenticated message 105'. Thus, a short timer can expire if the communication device 102 is not actively receiving user inputs that are indicative of user control. Alternatively, the communication device 102 can be required to maintain image capture of a portion of the user's body to perform pattern recognition of the user 104 during the process of authenticating and transmitting the authenticated message 105'. For example, the image capture can include face, retina, iris, eye vein, palm vein, and finger vein and/or other biometrics characteristics.

According to at least one embodiment, the determination that the message 105 requires user authentication can be based on at least one of: (i) the content 120 of the message 105, (ii) a context associated with the communication device 102, (iii) historical data 128 corresponding to a user associated with the communication device 102, and (iv) information associated with a recipient of the message 105. In one or more embodiments, the determination that the message 105 requires user authentication can be "crowd-sourced" wherein a security level is based at least in part upon other individuals or systems designating similar messages or users as suspicious. In particular, such messages that have been flagged as spam by other users or have repeatedly failed authentication with other users would require elevated authentication and possibly even trigger a warning to the recipient.

In an illustrative example, the content of the message 105 can have keywords identifying at least one of: a location from which the message 105 is being transmitted; a weather condition at the location from which the message 105 is being transmitted; a physical activity performed by a user who inputs the message 105; and a monetary value of significance that is settable by a user of the device; and type of information request by user. It is appreciated that this list is not intended to be exclusive or complete and that other keywords can be identified and/or specified, without limitation. In one embodiment, the presence within the content of one or more of these keywords can indicate the need for user authentication of the message 105. In another illustrative example, the context of the communication device 102 can be at least one of: a location of the communication device 102; a route taken by the communication device 102; an ambient environment of the communication device 102; and a motion detected by the communication device 102. As with the content list, it is appreciated that this list of contextual information is not intended to be exclusive or complete and that other contexts can be identified and/or specified, without limitation.

In yet another illustrative example, the historical data 128 corresponding to a user associated with the communication device 102 can be used to determine a need for authentication or serve as a baseline for comparison with a biometric input for authenticating a user. A profile derived from a user's historical data 128 can serve as a point of contrast with the content of the message 105 or the context associated with the communication device 102. The message certification utility 116 can infer that the message 105 is unexpected in some regard based at least in part upon the contrast.

The historical data 128 can also contain past biometric inputs and templates of the user that can be relied upon for future authentications. Examples of such historical data 128 can be a voice print or characterization that can be correlated with a voice that conveyed the message 105. Another example is a recorded image of a unique physical attribute of a device user 104a that can be compared to a new image taken by the communication device 102. An additional example of historical data 128 is a recorded characteristic or pre-established motion of the user that can be compared to a motion detected by the communication device 102. Further examples include a pre-set password, a pre-set security biographical response, a pre-established biometric image pattern (fingerprint, eye, etc.), a biographical attribute of the user (e.g., color of hair, eye, skin), a pre-established biometric audio pattern (sound sequence), a pre-established biometric electrical pattern (heart signature), and other pattern information of the user.

In one embodiment, message certification utility 116 selects the biometric capturing component 132 based on contextual data by determining that at least one ambient condition indicates that a particular biometrical capturing device is ineffective. In an illustrative example, the at least one ambient condition can be: (i) moisture; (ii) an ambient illumination; (iii) an obstructed sensor (iv) an activity associated with motion of the communication device 102; (v) a barometric pressure; (vi) ambient noise, (vii) ambient temperature, (viii) location, (ix) elevation, etc., without limitation. In one illustrated embodiment, the message certification utility 116 selects the biometric capturing component 132 based on contextual data by determining, from at least one of historical data 128 and recipient data 130, which biometric input is verifiable by a recipient of the message 105. For example, capturing a date-stamped image of the user can be a means of authentication in situations where the recipient can recognize the user.

In one embodiment, the message certification utility 116 selects a biometric capturing component 132 in order to cross-verify keywords for at least one of location, weather condition, and physical activity. Authentication can go beyond confirming the identity of the user based upon biometric input(s). Authentication can be used to independently confirm and cross-verify contextual descriptions in the content of the message 105 against sources of information accessible by the communication device 102. For example, the message 105 can mention a location that the user was in, is currently in, or will be in. The communication device 102 can access historical data 128 for where the user has been during the appropriate time frame, can sense where the communication device 102 currently is, and can access scheduled location information based upon appointments or travel itineraries to cross-verify these keywords. For another example, the message 105 can state what the user is currently doing that can be cross-verified by sensing contextual data such as physiological sensors, motion sensors, etc. As an additional example, the message 105 can describe a current ambient condition such as temperature, precipitation, etc., that can be cross-verified based upon detected contextual data.

The message certification utility 116 can trigger at least one selected biometric capturing component 132 to capture a corresponding biometric input from a user of the communication device 102. The triggering can be performed in the background such as with an always-on voice or always-on camera capability that can capture the selected biometric input without prompting a specific user response.

In an example, the message certification utility 116 generates and issues a prompt requesting the biometric input at the selected biometric capturing component 132, and advising the user of which biometric information is requested, or of the choices/options. A response time is established for receipt of the biometric input such that a determination can be made of whether the requested biometric input has been received. Based on a determination that the response time has lapsed without receiving an authenticated biometric input, transmission of the draft message can be withheld and the user can be notified of the authentication failure. In response to determining that the requested biometric input was received, a further determination can be made whether another biometric input is required. When another biometric input is required, the user can be prompted again to input the specific second biometric information. Based on the determination that another biometric input is not required, the message certification utility 116 performs authentication of the received biometric input. For example, when the selected biometric capturing component 132 is a camera of the communication device 102, the message certification utility 116 can: capture an image of the device user 104; perform facial recognition of the captured image; and authenticate the user in response to the facial recognition identifying a match with a pre-identified image of the user.

The message certification utility 116 can select a biometric capturing component 132 based at least in part on the recipient being able to verify the corresponding biometric input. In one embodiment, the message certification utility 116 accesses at least one of historical data 128 and recipient data 130. The message certification utility 116 associates accessed data to relevant biometric capturing components 132. For example, the message certification utility 116 can access a telephone log that indicates that the user and the recipient have frequently spoken, and thus the recipient should recognize the voice of the user. For another example, the message certification utility 116 can access a web conference or meeting schedule and determine that the user and recipient have frequently been in the same room, and thus the recipient should recognize the face of the user. For another example, the message certification utility 116 can access previous correspondence between the user and the recipient and determine that the recipient anticipates that the user would be in a particular context at the time that the message 105 originated. Thus, including the historical data 128 in the authentication can enable the message certification utility 116 to cross-verify the circumstances of the message transmission and select an appropriate biometric capturing component 132.

The message certification utility 116 can assign a security level to each biometric capturing component 132 and determine what security level is required for a particular message. Selection of a particular biometric capturing component 132 among the multiple available biometric capturing components 132 is based at least in part on the selected component satisfying a security level for the particular message. The message certification utility 116 can use more than one biometric input 134 in order to satisfy a particular security level of the message 105. The message certification utility 116 can assign a specific message security level to each biometric capturing component 134. In at least one embodiment, the message certification utility 116 assigns a specific message security level that requires a message authentication via a combination of at least two biometric capturing components 132. An example of a requirement for an increased security level can be based on whether or not an action is being requested of the recipient. For example, a message that simply presents information and is determined to make no demand upon the recipient can have a first security level. Another message that includes a monetary value above a certain threshold amount (e.g., $5.00) and is determined to be a request for money from the recipient can be assigned a second, higher security level. As another example, a message 105 that requests personal information that triggers a privacy concern could warrant a third, even higher security level.

The message certification utility 116 can determine a security level of the message 105 associated with or based on at least one of (a) the content of the message 105 (e.g., through introspection and keyword search) and (b) a context associated with the communication device 102a. The message certification utility compares the security level determined for the message 105 with the security level assigned to each biometric capturing component 132. The message certification utility determines whether a single biometric capturing component 132 can satisfy the security level of the message 105. When a single biometric capturing component 132 can satisfy the security level of the message 105, the message certification utility selects an appropriate biometric capturing component 132 (i.e., a biometric component that satisfies the message security level), based on the message security level and a current context of the communication device 102a. When a single biometric capturing component 132 cannot satisfy the message security level of the message 105, the message certification utility selects a combination of at least two biometric capturing components 132 that collectively satisfy the message security level of the message 105. The message certification utility 116 obtains the selected biometric input(s) either automatically, by prompting for user entry, or a combination of both.

Figure 5:
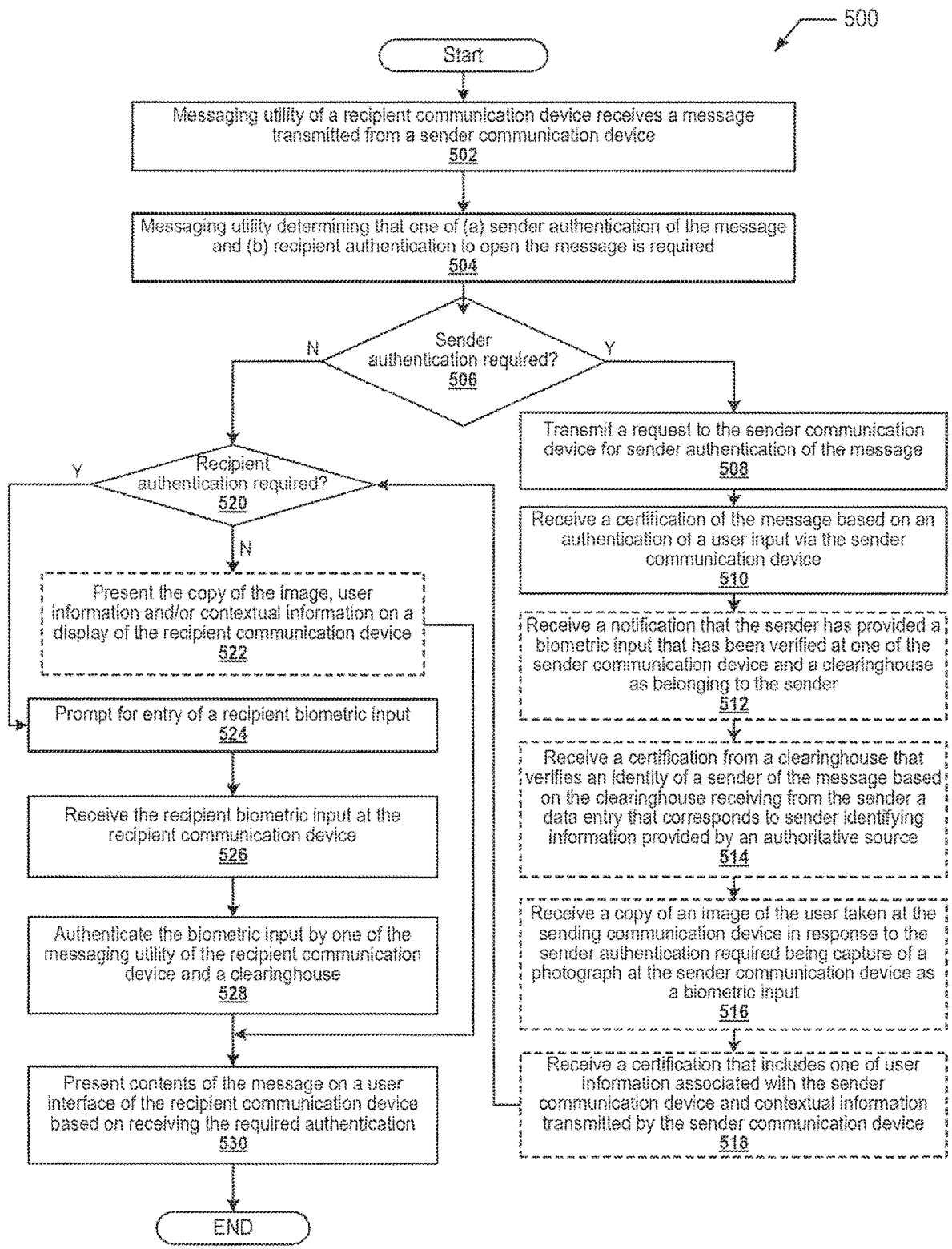
FIG. 5 is a flow chart of a method for user authentication of a message that is being received by a recipient communication device, according to one embodiment.

FIG. 5 illustrates an example method 500 for user authentication of a message that is being received by a recipient communication device. The method 500 includes: a messaging utility of a recipient communication device receiving a message transmitted from a sender communication device (block 502). The messaging utility determines in block 504 whether one of (a) sender authentication of the message and (b) recipient authentication to open the message is required. A decision is made in block 506 whether sender authentication is required. In response to a determination in decision block 506 that sender authentication is required, the method includes transmitting a request to the sender communication device for sender authentication of the message (block 508). In block 510, the recipient communication device receives a certification of the message based on an authentication of a user input via the sender communication device. For example, in block 512, the recipient communication device can receive a notification that the sender has provided a biometric input that has been verified as belonging to the sender at one of the sender communication device and a verification clearinghouse. Alternatively, the recipient communication device in block 514 can receive a certification from a verification clearinghouse that verifies an identity of a sender of the message based on the verification clearinghouse receiving from the sender a data entry that matches sender identifying information provided by an authoritative source.

In one embodiment, the recipient communication device can receive a copy of an image of the user taken at the sending communication device (block 516). The receiving of the copy of the image can be in response to the recipient communication device specifying the biometric input in the request to the sender authentication. In particular, the recipient communication device can require capture of a photograph at the sender communication device. In one embodiment, the recipient communication device in block 518 can receive a certification that includes one of user information associated with the sender communication device and contextual information transmitted by the sender communication device. In response to receipt of the certification, method 500 can first require a check for whether recipient certification is also required (block 520). The determination as to whether recipient authentication is required in decision block 520 may also be in response to determination in decision block 506 that sender authentication is not required.

In response to a determination in decision block 520 that recipient authentication is not required, the recipient communication device can present the copy of the image, user information and/or contextual information on a display of the recipient communication device (block 522). Then method 500 moves to block 530 where the user interface of the recipient communication device presents contents of the message in response to receiving the required (sender) authentication. Method 500 then ends. Notably, in an alternate embodiment, the method 500 may not make a determination as to whether recipient authentication is required prior to presenting the copy of the image, user information, and/or contextual information.

In response to a determination in block 520 that recipient authentication is required, then method 500 includes prompting for entry of a recipient biometric input (block 524). The recipient communication device receives the recipient biometric input (block 526). The method 500 further includes authenticating the biometric input by one of the messaging utility of the recipient communication device and a verification clearinghouse (block 528). The user interface of the recipient communication device presents contents of the message in response to receiving the required authentication (block 530). Then method 500 ends. As provided by method 500, the required authentication at block 530 can be sender only authentication, recipient only authentication, a combination of both sender and recipient authentication, or no authentication.

Figure 6:
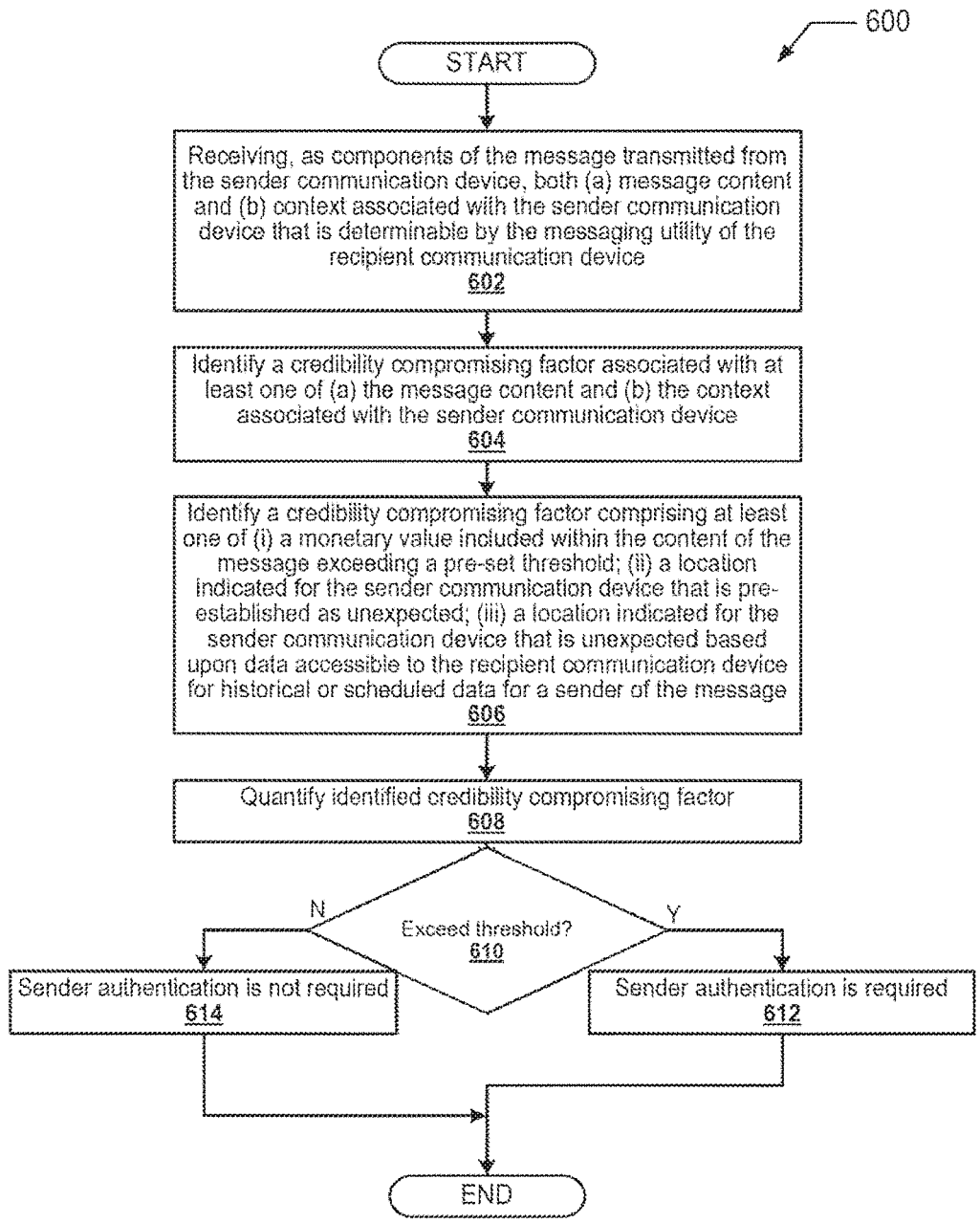
FIG. 6 is a flow chart of a method for determining when sender authentication is required, according to one embodiment.

FIG. 6 illustrates a method 600 for determining when one of (a) sender authentication of the message and (b) recipient authentication to open the message is required. The method 600 includes receiving, as components of the message transmitted from the sender communication device, both (a) message content and (b) context associated with the sender communication device. The messaging utility of the recipient communication device determines whether the message content and context suggest a need for user authentication (block 602). In block 604, the messaging utility identifies a credibility compromising factor associated with at least one of (a) the message content and (b) the context associated with the sender communication device. For example, the messaging utility can identify a credibility compromising factor comprising at least one of (i) a monetary value included within the content of the message exceeding a pre-set threshold; (ii) a location indicated for the sender communication device that is pre-established as unexpected; (iii) a location indicated for the sender communication device that is unexpected based upon data accessible to the recipient communication device for historical or scheduled data for a sender of the message (block 606). In block 608, the messaging utility quantifies the identified credibility compromising factor. In decision block 610, a determination is made as to whether the quantified, identified credibility compromising factor exceeds a threshold value. In response to a determination in decision block 610 that that the quantified, identified credibility compromising factor exceeds the threshold value, the messaging utility determines that sender authentication of the message is required (block 612). Then, method 600 ends. In response to a determination in decision block 610 that that the quantified, identified credibility compromising factor does not exceed the threshold value, the messaging utility determines that sender authentication of the message is not required (block 614). Then, method 600 ends.

Figure 7:
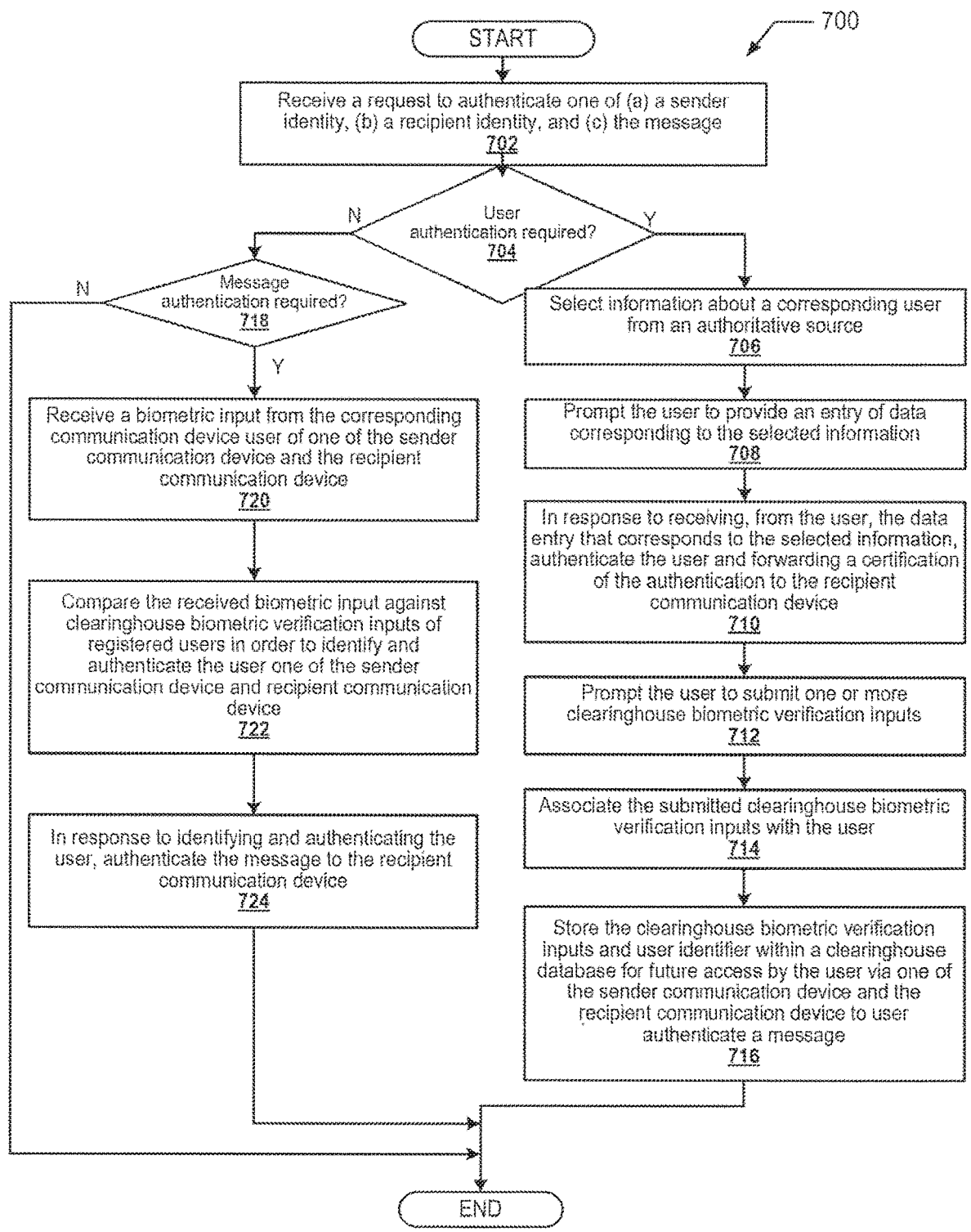
FIG. 7 illustrates an example method for user authentication by a verification clearinghouse of a message received by a recipient communication device from a sender communication device, according to one or more embodiments.

FIG. 7 illustrates a method by which authentication of a user of a communication device is completed by a verification clearinghouse. The method 700 includes the clearinghouse receiving a request to authenticate one of (a) a sender identity, (b) a recipient identity, and (c) the message (block 702). A determination is made in decision block 704 whether user authentication is required. In response to a determination in decision block 704 that user authentication is required, the verification clearinghouse selects information about a corresponding user from an authoritative source (block 706). The verification clearinghouse prompts the user to provide an entry of data corresponding to the selected information (block 708). In response to receiving, from the user, the data entry that corresponds to the selected information, the verification clearinghouse compares the user provided entry with the information from the authoritative source and authenticates the user when the user provided entry is determined to be correct. The method 700 then includes the verification clearinghouse forwarding a certification of the authentication to the recipient communication device (block 710). In block 712, the verification clearinghouse prompts the user to submit one or more clearinghouse biometric verification inputs. The verification clearinghouse associates the submitted clearinghouse biometric verification inputs with the user (block 714). The verification clearinghouse in block 716 stores the clearinghouse biometric verification inputs and user identifier within a clearinghouse database for future access by the user via one of the sender communication device and the recipient communication device to user authenticate a message.

In response to a determination in decision block 704 that user authentication is not required, the verification clearinghouse in block 718 makes a further determination of whether message authentication is required. In response to a determination in decision block 718 that message authentication is not required, then method 700 ends. In response to a determination in decision block 718 that message authentication is required, method 700 includes receiving a biometric input from the corresponding communication device user of one of the sender communication device and the recipient communication device (block 720). The verification clearinghouse compares the received biometric input against clearinghouse biometric verification inputs of registered users. A resulting match identifies and authenticates the user of the communication device (block 722). In response to identifying and authenticating the user, the verification clearinghouse authenticates the message to the recipient communication device (block 724). Then method 700 ends.

In the flow chart of FIGS. 5-7 presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A method, comprising:
    determining that biometric identity authentication is required before an electronic message is provided for display to a user;
    identifying historical user information relating to a previous interaction between the user and a sender of the electronic message;
    in response to determining that biometric identity authentication of the electronic message is required, selecting a selected type of biometric input for the biometric identity authentication from a plurality of types of biometric input based on the historical user information, and prompting for the selected type of biometric input;
    receiving biometric data corresponding to the selected type of biometric input; and
    in response to receiving the biometric data, certifying that the biometric identity authentication was provided.

2. The method of claim 1, comprising:
    performing the certifying at a first device; and
    providing a certification of the certified biometric identity authentication to a second device before the electronic message is displayed.

3. The method of claim 2, wherein the first device comprises a database of biometric verification data of registered users, the method further comprising:
    matching the received biometric data with known biometric verification data in the database of biometric verification data of registered users; and
    certifying that the biometric identity authentication was provided based on the matching.

4. The method of claim 3, further comprising:
    after certifying that the biometric identity authentication was provided, prompting for an additional type of biometric input;
    receiving additional biometric verification data corresponding to the additional type of biometric input; and
    storing, in the database of biometric verification data of registered users, the additional biometric verification data in connection with an identifier for the user, wherein the additional biometric verification data is stored for use in future biometric identity authentications of other electronic messages.

5. The method of claim 1, further comprising:
    receiving the electronic message at a first device;
    receiving the biometric data at the first device; and
    providing, in response to the certifying, the electronic message for display at the first device.

6. The method of claim 1, further comprising:
    receiving the historical user information from a networked authoritative source, different than a device certifying that the biometric identity authentication was provided.

7. The method of claim 1,
    wherein selecting the selected type of biometric input comprises determining, based on the historical user information and recipient data associated with a recipient of the electronic message, which type of biometric input from the plurality of types of biometric input is verifiable by the recipient of the electronic message.

8. The method of claim 7, further comprising:
    determining, based on the historical user information and recipient data, that the user and the recipient have communicated by voice; and
    selecting voice as the selected type of biometric input.

9. The method of claim 7, further comprising:
    determining, based on the historical user information and recipient data, that the user and the recipient have been at a same location for a same scheduled time; and
    selecting a facial scan as the selected type of biometric input.

10. The method of claim 1, wherein the plurality of types of biometric input comprise facial scan, retina scan or iris scan, body vein scan or blood vessel scan, and voice.

11. A biometric clearinghouse system, comprising:
a first network interface for communications with a first communication device and a second communication device;
one or more processors; and
a non-transitory memory storing instructions thereon that, when executed by the one or more processors, perform operations comprising:
determining that biometric identity authentication of an electronic message is required before the electronic message is provided for display at the first communication device or the second communication device, the electronic message being transmitted between the first communication device and the second communication device;
identifying historical user information relating to a previous interaction between a sender and a recipient of the electronic message;
in response to determining that biometric identity authentication of the electronic message is required, selecting a selected type of biometric input for the biometric identity authentication from a plurality of types of biometric input based on the historical user information, and prompting for the selected type of biometric input;
receiving biometric data corresponding to the selected type of biometric input; and
in response to receiving the biometric data, providing a certification that the biometric identity authentication was received to the first communication device or the second communication device.

12. The biometric clearinghouse system of claim 11, further comprising:
a second network interface for communication with a remote authoritative source that provides identifying information about one or more users associated with the first communication device or the second communication device,
wherein the operations further comprise:
receiving user the historical user information associated with a sender or recipient of the electronic message from the remote authoritative source.

13. The biometric clearinghouse system of claim 12, wherein determining that biometric identity authentication of an electronic message is required comprises receiving a request to authenticate an identity of at least one of the one or more users associated with the first communication device or the second communication device.

14. The biometric clearinghouse system of claim 11, further comprising:
a database of biometric verification data of registered users,
wherein the operations further comprise:
matching the received biometric data with known biometric verification data in the database of biometric verification data of registered users; and
providing the certification that the biometric identity authentication was received based on the matching.

15. The biometric clearinghouse system of claim 14, wherein the operations further comprise:
after providing the certification that the biometric identity authentication was received, prompting for an additional type of biometric input;
receiving additional biometric verification data corresponding to the additional type of biometric input; and
storing, in the database of biometric verification data of registered users, the additional biometric verification data in connection with a user identifier, wherein the additional biometric verification data is stored for use in future biometric identity authentications of other electronic messages.

16. The biometric clearinghouse system of claim 11, wherein the plurality of types of biometric input comprise facial scan, retina scan or iris scan, body vein scan or blood vessel scan, and voice.

17. The biometric clearinghouse system of claim 11, wherein selecting the selected type of biometric input comprises determining, based on the historical user information and recipient data associated with a recipient of the electronic message, which type of biometric input from the plurality of types of biometric input is verifiable by the recipient of the electronic message.

18. A non-transitory computer-readable storage medium comprising instructions stored therein, which when executed by one or more computing devices, cause the one or more computing devices to:
determine that biometric identity authentication of an electronic message is required before the electronic message is provided for display at a first communication device or a second communication device, the electronic message being transmitted between the first communication device and the second communication device;
identify historical user information relating to a previous interaction between a sender and a recipient of the electronic message;
in response to determining that biometric identity authentication of the electronic message is required, select a selected type of biometric input for the biometric identity authentication from a plurality of types of biometric input based on the historical user information, and prompt for the selected type of biometric input;
receive biometric data corresponding to the selected type of biometric input; and
in response to receiving the biometric data, provide a certification that the biometric identity authentication was received to the first communication device or the second communication device.

19. The non-transitory computer-readable storage medium of claim 18, wherein the instructions further cause the one or more computing devices to:
match the received biometric data with known biometric verification data in a database of biometric verification data of registered users; and
provide the certification that the biometric identity authentication was received based on matching the received biometric data with known biometric verification data.

20. The non-transitory computer-readable storage medium of claim 19, wherein the instructions further cause the one or more computing devices to:
after providing the certification that the biometric identity authentication was provided, prompting for an additional type of biometric input;
receiving additional biometric verification data corresponding to the additional type of biometric input; and
storing, in the database of biometric verification data of registered users, the additional biometric verification data in connection with a user identifier, wherein the additional biometric verification data is stored for use in future biometric identity authentications of other electronic messages.

* * * * *